UNITED STATES PATENT OFFICE.

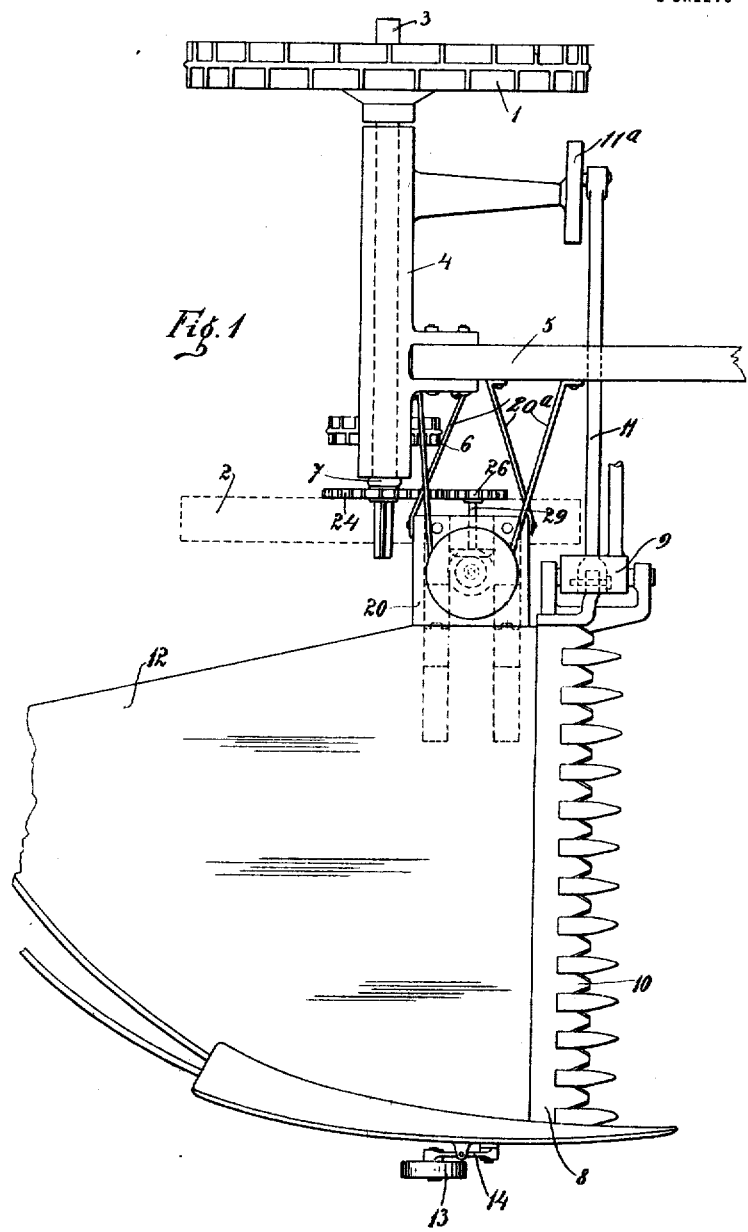

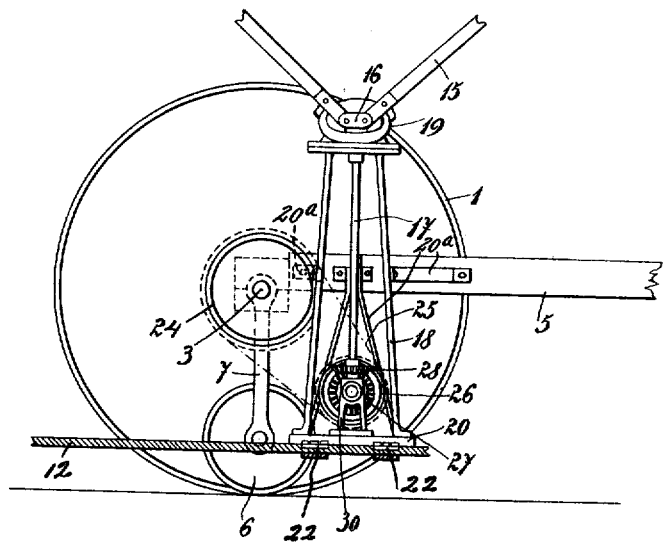
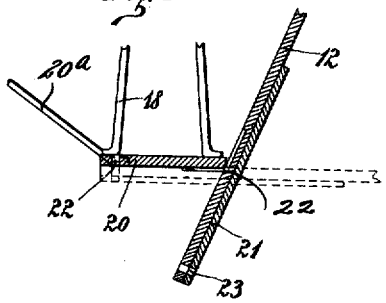

STĔPÁN SKALICKÝ, OF ČESKÁ SKALICE, AUSTRIA-HUNGARY.

MOWING-MACHINE.

1,211,972.  Specification of Letters Patent.  Patented Jan. 9, 1917.

Application filed November 27, 1914. Serial No. 874,201.

*To all whom it may concern:*

Be it known that I, STĔPÁN SKALICKÝ, subject of the Emperor of Austria-Hungary, residing at Česká Skalice, in Bohemia, Austro-Hungarian Empire, have invented new and useful Improvements in Mowing-Machines, of which the following is a specification.

My invention relates to mowing machines, and more particularly to that class of mowing machines which, after a slight adaptation, can be used both for grass mowing and grain reaping.

The object of the invention is to provide a novel arrangement of the reaping platform and of the rake guiding mechanism whereby the said parts are rendered easily and quickly removable so as to be connected or disconnected from the machine, in order to make the machine quickly adaptable for grain reaping or for grass mowing.

The invention consists in various details of construction and combination of parts hereinafter described with reference to the accompanying drawings and pointed out in the claim.

In the drawings, Figure 1 is a plan view of a device embodying the invention. Fig. 2 is a side elevation of the same. Fig. 3 is a rear elevation of the machine and shows the connection of the platform with the rake stand.

Referring to the drawings, 1 and 2 are the main driving and carrying wheels.

3 is the main axle journaled in the frame 4 to which the pole 5 is fastened. The wheel 2 is removable and can be replaced by a smaller wheel 6, pivoted on a vertical arm 7 which can be fastened to the frame 4, to facilitate the adapting of the machine for grain reaping.

The finger bar 8 is hinged at its inner end at 9 to the machine frame. The power to drive the knife 10 is transmitted through a pitman 11 which is connected in the usual well known manner to a crank 11ª, actuated from the main driving axle 3.

The platform 12 is removably connected with the cutting apparatus and is supported on the outer side by a small wheel 13 which is vertically adjustable in any known manner, for instance by being journaled at one end on the side wall of the platform 12, so that its angle of inclination can be varied at will.

The rakes 15 are hinged as usual to a hood 16, fixed to the upper end of a vertical shaft 17 which is journaled in a vertical stand 18. This stand carries at its upper end the cam 19 for controlling the motion of the rakes, and is fastened below to a plate 20, hinged at the outer or grain side to the platform 12. The platform 12 is connected to plate 20 by hinges 22, and in its horizontal position is supported by tie-rods 21, to which it can be firmly fastened by bolts 23 or the like. The plate 20 may be supported in any convenient manner, and in the present instance it is shown connected to the sleeve 4, and pole 5, by means of braces 20ª.

The power to drive the rakes is transmitted from the main axle 3 by means of a sprocket wheel 24, mounted on the latter, chain 25 and sprocket wheel 26 to the bevel gear 27, 28, and thus to the vertical shaft 17. The sprocket wheel 26 and the beveled wheel 27 are keyed to a short horizontal shaft 29, which is journaled in a smaller stand 30, located within the stand 17 and fastened to the plate 20, while the beveled wheel 28 is keyed to the lower end of the vertical shaft 17. The sprocket wheel 24 is removably fastened on the axle 3.

The platform being hinged to the support plate 20 of the rake stand 18, can be tilted into almost a vertical position, after the bolts 23, which secure the rigid connection of the parts 20 and 12ª had been removed (Fig. 3), thus facilitating transport of the machine along narrow roads. If the machine is to be used for grass mowing, the platform 12, together with the rake guiding mechanism is first removed, after the chain 25 has been taken off, and the connection between the platform and the cutting apparatus dissolved, the sprocket wheel 24 and the auxiliary driving wheel 6, with its arm 7 can also be removed, and the latter replaced by the wheel 2, thereupon the machine is transformed into a usual grass mowing machine.

It is evident that details of construction not forming part of this invention, such as the driving mechanism of the cutter, equipment of the platform and the rakes, arrangement of the main frame of the machine, and such like, can be varied at will, without departing from the spirit of the invention, and I do not wish to limit myself to the specific form shown by way of example in the drawing. Most reapers now in use can be adapted by certain alterations or exchange of certain parts to conform to my invention.

I claim:

In a combined reaper and mowing machine, the combination of a main frame, drive shaft, driving wheels mounted thereon, cutting knife and means for operating the latter, the driving wheel on the grass side of the machine being removable, a reaper attachment comprising an arm having at its lower end a supporting wheel adapted to take the place of the driving wheel on the grass side of the machine, means for attaching the upper end of the arm to the frame, a sprocket secured to the shaft when the reaper attachment is employed, a rake support mounted on the frame, rakes carried by the rake support, and means for operating the same from the sprocket wheel.

In testimony whereof I have signed my name to this specification in the presence of two subscribing witnesses.

STĚPÁN SKALICKÝ.

Witnesses:
JAN B. VOJÁČEK,
JOHN L. BOUCHAL.